United States Patent
Lin et al.

(10) Patent No.: US 6,876,194 B2
(45) Date of Patent: Apr. 5, 2005

(54) LINEAR VELOCITY SENSOR AND METHOD FOR REDUCING NON-LINEARITY OF THE SENSOR OUTPUT SIGNAL

(75) Inventors: Yingjie Lin, El Paso, TX (US); Steven Douglas Thomson, El Paso, TX (US); Samuel Roland Palfenier, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 112 days.

(21) Appl. No.: 10/373,432

(22) Filed: Feb. 26, 2003

(65) Prior Publication Data

US 2004/0164726 A1 Aug. 26, 2004

(51) Int. Cl.⁷ .............................. G10P 3/46; G01P 3/52
(52) U.S. Cl. ................. 324/163; 324/207.15; 336/223
(58) Field of Search .............................. 324/173, 174, 324/179, 207.11, 207.12, 207.13, 207.15, 207.24, 178, 160; 336/222, 223, 136, 231; 73/490, 488, 514.39

(56) References Cited

U.S. PATENT DOCUMENTS

| | | | |
|---|---|---|---|
| 3,054,976 A | * | 9/1962 | Lipshutz ..................... 336/136 |
| 3,743,794 A | * | 7/1973 | Miller, III ................ 360/294.1 |
| 3,943,443 A | | 3/1976 | Kimura et al. |
| 4,100,480 A | * | 7/1978 | Lytle et al. ............ 340/870.35 |
| 4,260,914 A | | 4/1981 | Hertrich |
| 5,698,910 A | * | 12/1997 | Bryant et al. ................. 310/12 |
| 5,929,736 A | * | 7/1999 | Sakamaki et al. ............ 336/96 |
| 6,310,472 B1 | * | 10/2001 | Chass ....................... 324/207.2 |
| 6,498,409 B1 | | 12/2002 | Collier-Hallman et al. |
| 6,580,264 B2 | * | 6/2003 | Nekado ................. 324/207.16 |

FOREIGN PATENT DOCUMENTS

JP          402156112 A  *  6/1990  ............ 324/207.24

* cited by examiner

Primary Examiner—N. Le
Assistant Examiner—Kenneth J Whittington
(74) Attorney, Agent, or Firm—Jimmy L. Funke

(57) ABSTRACT

Linear velocity sensor and method for reducing non-linearity in the output signal of the sensor are provided. The sensor comprises a ferromagnetic housing including an opening. The sensor further comprises a spool disposed in the housing. The spool includes a bore for receiving a slidable ferromagnetic rod. The ferromagnetic rod may be extendable through the opening in the housing. A magnet is mounted at the one end of the rod distal from the opening when the rod is substantially inserted in the bore. A coil is wound on the spool. The number of turns of the coil is arranged to taperingly increase as the coil progresses from an end of the spool proximate the opening in the housing to the opposite end of the spool. The tapering arrangement for the number of turns of the coil is selected to reduce non-linearity of an output signal of the coil indicative of linear velocity.

8 Claims, 3 Drawing Sheets

LINEAR VELOCITY SENSOR AND METHOD FOR REDUCING NON-LINEARITY OF THE SENSOR OUTPUT SIGNAL

BACKGROUND OF THE INVENTION

Linear velocity sensors (or simply velocity sensors) may play a very important role in the control of any mechanical system motion, or vibration that may be encountered by the mechanical system. For example, in the automotive industry, luxury vehicles are expected to provide "premium" performance, such as a smoother, or quieter ride, under a wide range of varying operational conditions. It is known that adaptive or proactive control may be provided to mechanically tune the suspension system, such as for the vehicle chassis, and/or the engine mounts, to accomplish this premium performance. Either an adaptive or a proactive vibration control system needs to sense system motion, such as relative displacements and relative velocities in order to select an appropriate vibration control strategy. Typically, a "linear relative velocity" sensor is used to provide the mechanical system velocity information for these types of control systems.

There are presently a number of velocity sensing techniques that can provide the relative velocity information. They could be broadly divided into three categories:

1) mathematically differentiating a position signal;
2) directly measuring velocity; or
3) mathematically integrating an acceleration signal.

The first technique is somewhat limited since the derivative of the position signal generally introduces an unacceptable high level of noise to the resulting signal, and, consequently, lacks sufficient accuracy for meeting high-performance system requirements. The third technique has generally very good noise immunity because of the filtering-effects provided by the integration. However, for this sensing technique to work, the initial condition(s) of the system are required. This would result in additional complexity that incrementally adds to the cost of the sensor. Further, this technique may undesirably introduce relatively large phase delays. The second technique for sensing velocity, i.e., a direct measurement method, generally provides a versatile design choice to the designer because it avoids the issues concomitant with the first and third sensing techniques.

One common way to measure relative velocity is to use a sensor made up of a coil and a magnet mounted on a movable plunger. The coil is typically made with a uniformly distributed winding. That is, the number of turns is constant along the longitudinal axis of the spool on which the coil is wound. Theoretically, the coil voltage output signal should be proportional to the rate of change (e.g., speed) of the flux developed within the coil. Although this type of design has proven to be useful to generate velocity information, there are some issues that have yet to be addressed.

One issue that needs to be addressed is the fact that the output signal indicative of velocity information is undesirably dependent upon the plunger position. For example, as the plunger moves to an extended position from a retracted position over an exemplary practical range of plunger travel (represented in FIG. 1 by a line 10 with twin-headed arrows) the coil output signal increases, notwithstanding of a constant positive velocity, e.g., velocity V1. Conversely, over the same range of plunger travel, the coil output would decrease in the presence of a constant negative velocity −V1. That is, the output level of the signal indicative of velocity varies not just as a function of the actual velocity sensed by the coil but also as a function of plunger position. Thus, even though the velocity being sensed is in fact constant, the output signal from the coil varies depending on the travel position of the plunger.

Another factor for reducing the sensor cost is the ability to package relatively small components within the sensor housing, e.g., the magnet and coil. Unfortunately, the size of the magnet used in various known configurations, may result in a relatively bulky sensor, which is generally undesirable for applications where spacing may be scarce.

In view of the foregoing considerations it would be desirable to provide a velocity sensor with an improved linear output range. That is, a sensor having an output signal that varies essentially as function of the actual velocity sensed by the sensor and exhibits reduced sensitivity to plunger position. It would be further desirable to provide in a smaller package a reliable, accurate and relatively inexpensive velocity sensor with an improved linear output range.

BRIEF SUMMARY OF THE INVENTION

Generally, the present invention fulfills the foregoing needs by providing in one aspect thereof, a linear velocity sensor that comprises a ferromagnetic housing including an opening. The sensor further comprises a spool disposed in the housing. The spool includes a bore for receiving a slidable ferromagnetic rod. The ferromagnetic rod may be extendable through the opening in the housing. A magnet is mounted at the one end of the rod distal from the opening when the rod is substantially inserted in the bore. A coil is wound on the spool. The number of turns of the coil is arranged to taperingly increase as the coil progresses from an end of the spool proximate the opening in the housing to the opposite end of the spool. The tapering arrangement for the number of turns of the coil is selected to reduce non-linearity of an output signal of the coil indicative of linear velocity.

In another aspect thereof, the present invention further fulfills the foregoing needs by providing a method for reducing output signal non-linearity in a linear velocity sensor. The method allows providing a ferromagnetic housing that includes an opening. The method further allows disposing a spool in the housing. A slidable ferromagnetic rod is received in a bore in the spool. The ferromagnetic rod is extendable through the opening in the housing. A magnet is mounted at the one end of the rod distal from the opening when the rod is substantially inserted in the bore. A coil is wound on the spool. The method allows arranging the number of turns of the coil to taperingly increase as the coil progresses from an end of the spool proximate the opening in the housing to the opposite end of the spool. The arrangement for the number of turns of the coil is selected to reduce non-linearity of an output signal of the coil indicative of linear velocity.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
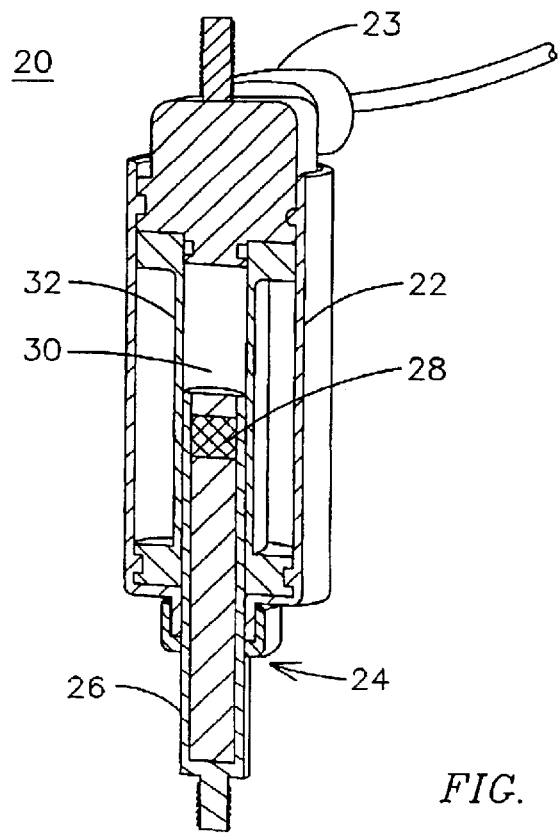
FIG. 2 illustrates an exemplary embodiment of a linear velocity sensor embodying aspects of the present invention for reducing the non-linear behavior in the output signal of FIG. 1.

FIG. 2 illustrates an exemplary embodiment of a linear velocity sensor 20 embodying aspects of the present invention. As illustrated in FIG. 2, a ferromagnetic housing 22 includes an opening 24 for receiving a relatively small, ferromagnetic rod 26 with a magnet 28 mounted on one end of rod 26. The opposite end of housing 22 may be closed to the ferromagnetic plunger by the housing of an interface connector 23. As will be appreciated by those skilled in the art, since the housing is made up of ferromagnetic material, the housing functions as a flux concentrator of the magnetic flux from magnet 28. The rod essentially constitutes a plunger slidable or extendable through an axially-extending bore 30 in a spool 32.

Figure 3:
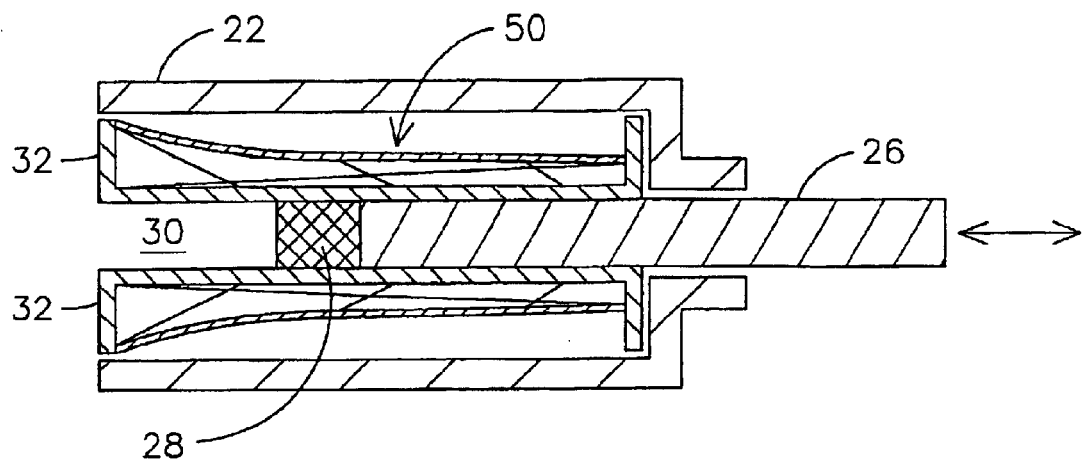
FIG. 3 illustrates a tapering coil that may be formed by building up or stacking a plurality of layers of winding on an embodiment that may comprise a generally cylindrical coil-receiving surface on a spool.
Figure 4:
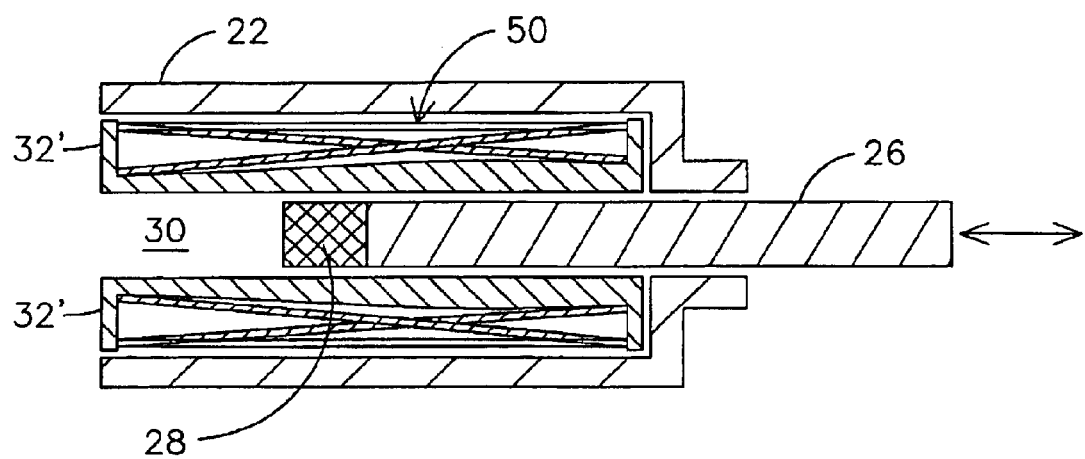
FIG. 4 illustrates an exemplary embodiment wherein the spool is configured to provide a tapering coil-receiving surface.

As shown in FIGS. 3 and 4, a coil 50 is wound around the spool 32. The coil is positioned between the plunger 26 and the housing 22, and, since each of such components is made up of ferromagnetic material, they jointly cooperate to form an electromagnetic magnetic circuit that generates an output signal indicative of velocity in response to slidable movement of the plunger, i.e., the rate of change of flux. The inventors of the present invention have innovatively recognized structure and/or techniques for reducing the dependency of the output signal of the linear velocity sensor on plunger position. More particularly, aspects of the present invention allow compensating for the non-linear behavior of the sensor, discussed in the background section of this specification, by configuring the coil as a tapered coil. The basic concept is to gradually increase the number of turns per unit length as the plunger travels from an extended position to a retracted position. The retracted position corresponds to the position wherein the rod would be fully or nearly fully inserted within the bore 30. The increase in number of turns due to the tapering allows compensating for the non-linearity that otherwise would be present in the output signal of the coil. That is, the degree of tapering and more precisely the variation in the number of turns along the axial length of the coil would be chosen to inversely match the signal attenuation encountered in a uniformly wound coil.

In accordance with aspects of the invention, the tapering may be provided to the coil using an appropriate winding technique. See U.S. published patent application No. 2004/0094653, titled "Method and Apparatus For Winding A Coil" for background information regarding techniques generally referred in the art as bank, progressive, or pilgrim winding techniques. The foregoing application is assigned in common to the same assignee of the present invention, and is herein incorporated by reference. For example, as illustrated in FIG. 3, the tapering may be formed by building up or stacking a plurality of layers of winding on the generally cylindrical surface of the spool 32.

Another exemplary embodiment to provide the tapering to the coil would be to configure the spool, such as a spool 32' in FIG. 4, to provide the desired tapering, e.g., by molding, the desired configuration with the spool. It will be appreciated that a separate tapering structure, e.g., a wedge 60 (FIG. 5), could be attached to the spool to provide the desired tapering configuration. Thus, in this exemplary embodiment, the tapering to the coil may be provided by either a separate structure mounted on the spool or a structure integrally constructed (e.g., by molding) with the spool.

Figure 1:
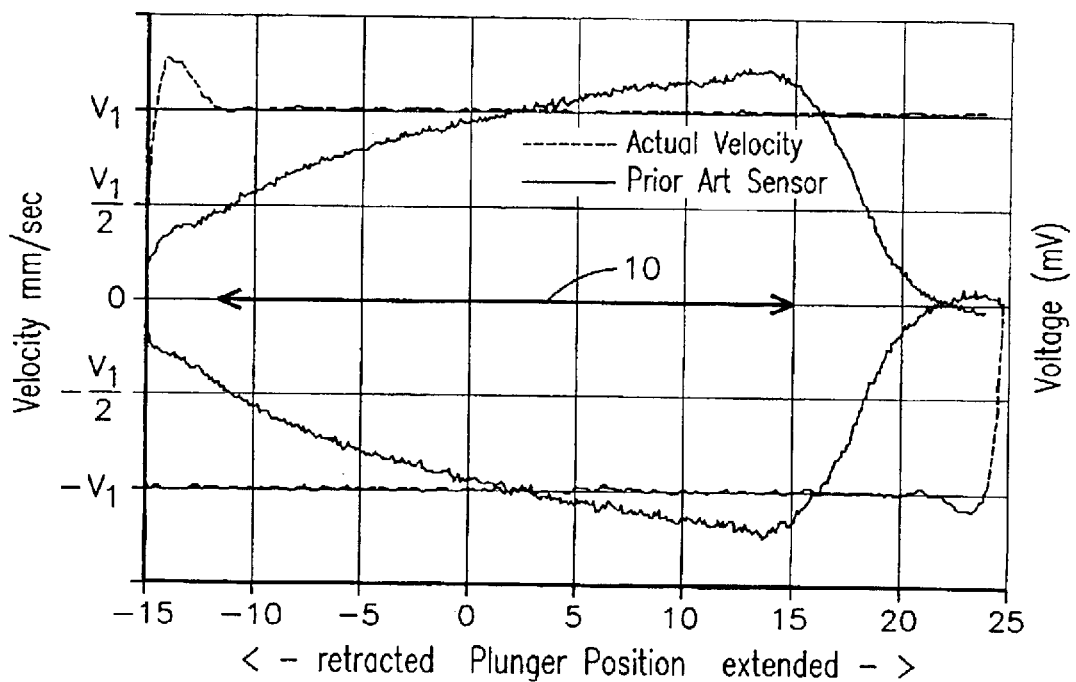
FIG. 1 illustrates an exemplary output signal of a prior art velocity sensor with a uniform coil as the plunger moves to an extended position from a retracted position over an exemplary practical range of plunger travel. Undesirably, the coil output signal varies, notwithstanding of a constant positive velocity.
Figure 5:
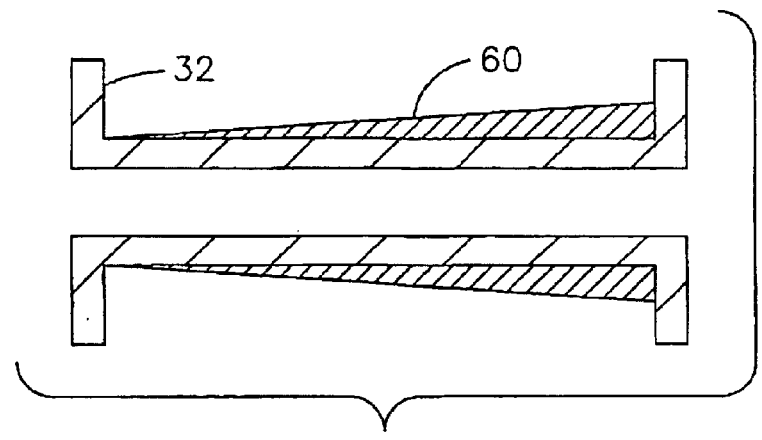
FIG. 5 illustrates yet another embodiment wherein a separate tapering structure, e.g., a wedge may be attached to the spool to provide the desired coil tapering arrangement.
Figure 6:
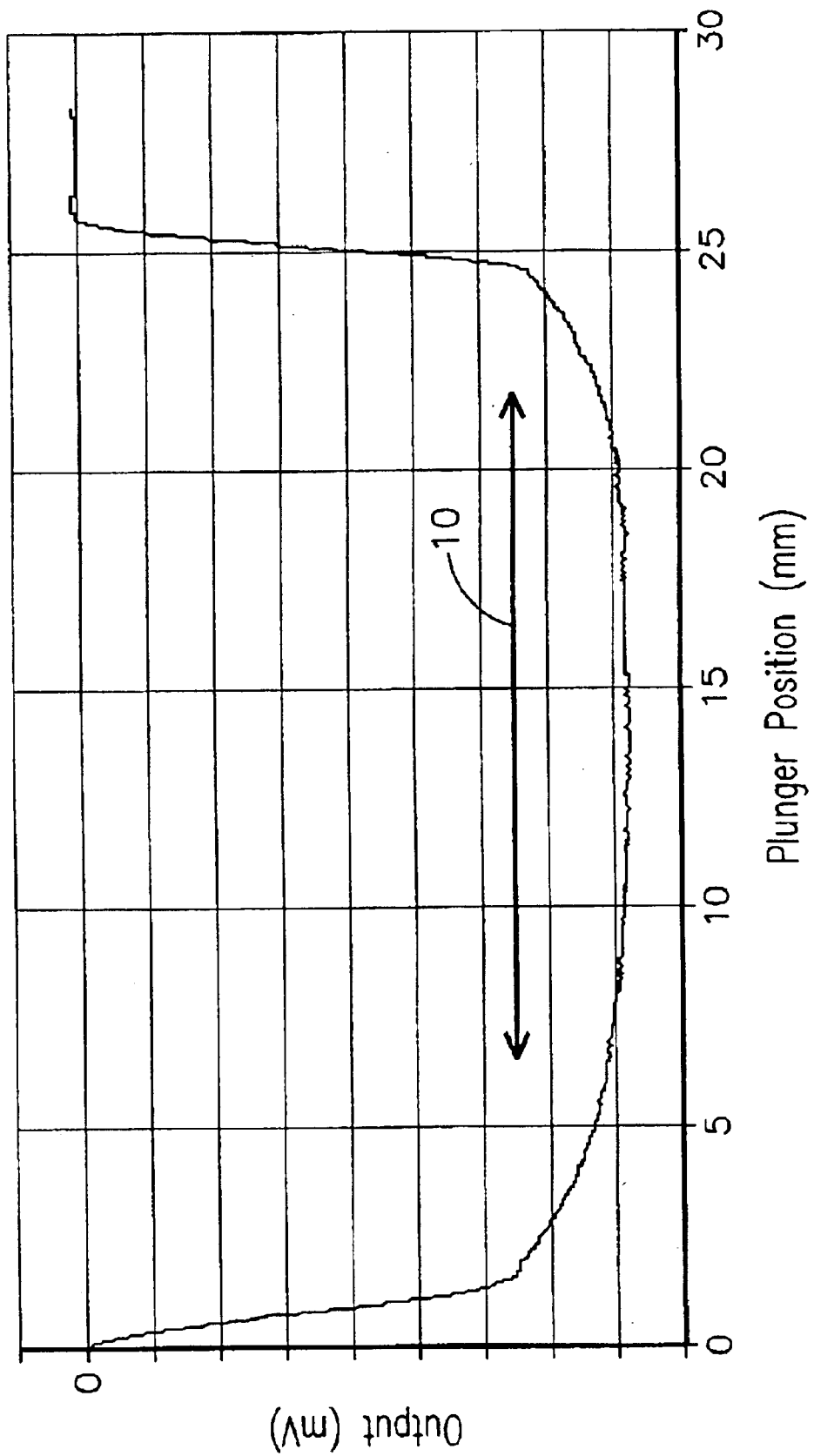
FIG. 6 is a plot of the output signal from an exemplary velocity sensor with a coil has been tapered in accordance with any of the embodiments of FIGS. 3–5.

FIG. 6 is a plot of the output signal from an exemplary velocity sensor with a coil has been tapered in accordance with any of the embodiments discussed in the context of FIGS. 3–5. It will be appreciated that the signal variation as a function of plunger position over an exemplary range (as represented by line 80) is substantially reduced as compared to the output signal of a non-tapered coil (FIG. 1). The plot assumes a constant velocity input.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A linear velocity sensor comprising:
   a ferromagnetic housing including an opening;
   a spool disposed in the housing and including a bore for receiving a slidable ferromagnetic rod, the ferromagnetic rod extendable through the opening in the housing;
   a magnet mounted at the one end of the rod distal from the opening when the rod is substantially inserted in the bore; and
   a coil wound on the spool, the number of turns of the coil being arranged to non-linearly increase as the coil progresses from an end of the spool proximate the opening in the housing to the opposite end of the spool, the non-linear increase for the number of turns of the coil selected to compensate for non-linear effects that affect the coil and thus reduce non-linearity of an output signal of the coil indicative of linear velocity.

2. The linear velocity sensor of claim 1 wherein the surface of the spool for receiving the coil is non-linearly tapered to provide the non-linear increase to the number of turns of the coil.

3. The linear velocity sensor of claim 1 further comprising a wedge mounted on the spool to provide the non-linear increase to the number of turns of the coil.

4. The linear velocity sensor of claim 1 wherein the spool comprises a generally cylindrical surface for winding the coil, and the non-linear increase to the number of turns of the coil is provided by progressively stacking a plurality of layers of winding on the generally cylindrical surface of the spool.

5. A method for reducing output signal non-linearity in a linear velocity sensor, the method comprising:

providing a ferromagnetic housing including an opening;

disposing a spool in the housing;

receiving a slidable ferromagnetic rod in a bore in the spool, the ferromagnetic rod extendable through the opening in the housing;

mounting a magnet at the one end of the rod distal from the opening when the rod is substantially inserted in the bore;

winding a coil on the spool; and arranging the number of turns of the coil to non-linearly increase as the coil progresses from an end of the spool proximate the opening in the housing to the opposite end of the spool; the non-linear increase for the number of turns of the coil selected to compensate for non-linear effects that affect the coil and thus reduce non-linearity of an output signal of the coil indicative of linear velocity.

6. The method of claim 5 further comprising non-linearly configuring the surface of the spool that receives the coil to provide the non-linear increase to the number of turns of the coil.

7. The method of claim 5 further comprising mounting a wedge on the spool to provide the non-linear increase to the number of turns of the coil.

8. The method of claim 5 further comprising gradually stacking a plurality of layers of winding on a generally cylindrical surface of the spool to provide the non-linear increase to the number of turns of the coil.

* * * * *